United States Patent
Dundas et al.

(10) Patent No.: US 7,599,872 B2
(45) Date of Patent: Oct. 6, 2009

(54) METHOD AND SYSTEM FOR ASSET ALLOCATION

(75) Inventors: Doug R. Dundas, Brooklyn, NY (US); Rui Defigueiredo, San Francisco, CA (US); Paul Goldwhite, Greenwich, CT (US)

(73) Assignee: Citibank, N.A., New York, NY (US)

( * ) Notice: Subject to any disclaimer, the term of this patent is extended or adjusted under 35 U.S.C. 154(b) by 906 days.

(21) Appl. No.: 10/939,641

(22) Filed: Sep. 13, 2004

(65) Prior Publication Data

US 2005/0171883 A1    Aug. 4, 2005

Related U.S. Application Data

(60) Provisional application No. 60/501,833, filed on Sep. 11, 2003, provisional application No. 60/518,332, filed on Nov. 10, 2003.

(51) Int. Cl.
*G06Q 99/00* (2006.01)
(52) U.S. Cl. .................................. 705/36 R; 705/37
(58) Field of Classification Search ............. 705/35–40
See application file for complete search history.

(56) References Cited

U.S. PATENT DOCUMENTS

| 7,085,738 | B2 * | 8/2006 | Tarrant .................... 705/36 R |
| 2002/0035527 | A1 | 3/2002 | Corrin ........................ 705/35 |
| 2002/0123953 | A1 | 9/2002 | Goldfarb et al. ........... 705/36 R |
| 2003/0195829 | A1 | 10/2003 | Oberuc .................... 705/36 R |
| 2005/0015326 | A1 * | 1/2005 | Terry ............................. 705/37 |
| 2007/0124227 | A1 * | 5/2007 | Dembo et al. ............. 705/36 R |

OTHER PUBLICATIONS

Franklin Edwards & Mustafa Onur Caglayan "Hedge Fund Performance and Manager Skill" Journal of Futures Markets, vol. 21, No. 11, 2001.*
International Search Report for Application No. PCT/US04/29933, dated Jul. 31, 2006, 3 pp.
Written Opinion for Application No. PCT/US04/2993, dated Jul. 31, 2006, 3 pp.
Supplementary European Search Report for Application No. EP 04 78 3957, dated Mar. 28, 2008, 3 pp.

* cited by examiner

*Primary Examiner*—Thu Thao Havan
*Assistant Examiner*—Thomas M Hammond, III
(74) *Attorney, Agent, or Firm*—George T. Marcou; King & Spalding LLP

(57) ABSTRACT

A method and system of matching an investor's objectives for portfolio investment return and risk with an assessment of a range of expected returns and risks that are likely to be generated by investment portfolios consisting at least in part of alternative asset classes that involves, for example, selecting available historical data for a plurality of alternative asset classes, unsmoothing the historical data based at least in part on historical data for traditional asset classes related to the respective alternative asset classes, and correcting the historical data for the alternative asset classes for an impact of survivorship and selection biases. A forecast of an expected return and risk is computed for each of the alternative asset classes, based at least in part on the unsmoothed and corrected historical data for the alternative asset classes, and at least one of the alternative asset classes that has an expected return and risk that corresponds substantially to the investor's objectives for portfolio investment return and risk is identified for inclusion in the investment portfolio.

15 Claims, 6 Drawing Sheets

LESS LIQUIDITY CAN LEAD TO HIGHER EXPECTED RETURNS WITHIN A GIVEN RISK LEVEL. "TRADITIONAL BENCHMARK" REPRESENTS A TRADITIONAL LONG-ONLY BENCHMARK (STOCKS, BONDS, CASH); "0% ILLIQUID" INCLUDES HEDGE FUNDS - A MORE LIQUID ALTERNATIVE ASSET. THE RISK LEVELS SPAN FROM SEEKING CAPITAL PRESERVATION AT "RISK 1" TO MAXIMUM CAPITAL GROWTH AT "RISK 5."

FIG. 2

TAXABLE WHOLE NET WORTH STRATEGIC† ALLOCATIONS*

0% ILLIQUIDITY

|  | LEVEL I | LEVEL II | LEVEL III | LEVEL IV | LEVEL V |
|---|---|---|---|---|---|
| CASH | 20% | 5% |  |  |  |
| FIXED INCOME | 68% | 58% | 38% | 11% |  |
| EQUITY | 0% | 18% | 47% | 73% | 83% |
| HEDGE FUNDS | 12% | 19% | 15% | 16% | 17% |
| REAL ESTATE |  |  |  |  |  |
| PRIVATE EQUITY |  |  |  |  |  |

10% ILLIQUIDITY

|  | LEVEL I | LEVEL II | LEVEL III | LEVEL IV | LEVEL V |
|---|---|---|---|---|---|
| CASH | 4% |  |  |  |  |
| FIXED INCOME | 50.5% | 33% | 9.5% |  |  |
| EQUITY | 17% | 42.5% | 66.5% | 74% |  |
| HEDGE FUNDS | 18.5% | 14.5% | 14% | 16% |  |
| REAL ESTATE | 7.5% | 5.5% | 4% | 2.5% |  |
| PRIVATE EQUITY | 2.5% | 4.5% | 6% | 7.5% |  |

20% ILLIQUIDITY

|  | LEVEL I | LEVEL II | LEVEL III | LEVEL IV | LEVEL V |
|---|---|---|---|---|---|
| CASH |  |  |  |  |  |
| FIXED INCOME | 28% | 6.5% |  |  |  |
| EQUITY | 38% | 59.5% | 64% |  |  |
| HEDGE FUNDS | 14% | 14% | 16% |  |  |
| REAL ESTATE | 11.5% | 8.5% | 5% |  |  |
| PRIVATE EQUITY | 8.5% | 11.5% | 15% |  |  |

30% ILLIQUIDITY

|  | LEVEL I | LEVEL II | LEVEL III | LEVEL IV | LEVEL V |
|---|---|---|---|---|---|
| CASH |  |  |  |  |  |
| FIXED INCOME | 4% |  |  |  |  |
| EQUITY | 52.5% | 54% |  |  |  |
| HEDGE FUNDS | 13.5% | 16% |  |  |  |
| REAL ESTATE | 12.5% | 7.5% |  |  |  |
| PRIVATE EQUITY | 17.5% | 22.5% |  |  |  |

NON TAXABLE WHOLE NET WORTH STRATEGIC† ALLOCATIONS

0% ILLIQUIDITY

|  | LEVEL I | LEVEL II | LEVEL III | LEVEL IV | LEVEL V |
|---|---|---|---|---|---|
| CASH | 23% | 12% |  |  |  |
| FIXED INCOME | 64% | 50% | 37.5% | 21% |  |
| EQUITY | 0% | 18% | 42.5% | 59% | 82% |
| HEDGE FUNDS | 13% | 20% | 20% | 20% | 18% |
| REAL ESTATE |  |  |  |  |  |
| PRIVATE EQUITY |  |  |  |  |  |

10% ILLIQUIDITY

|  | LEVEL I | LEVEL II | LEVEL III | LEVEL IV | LEVEL V |
|---|---|---|---|---|---|
| CASH | 6.5% |  |  |  |  |
| FIXED INCOME | 47% | 32.5% | 10% |  |  |
| EQUITY | 16.5% | 38.5% | 61% | 72% |  |
| HEDGE FUNDS | 20% | 19% | 19% | 18% |  |
| REAL ESTATE | 7.5% | 6% | 4.5% | 2.5% |  |
| PRIVATE EQUITY | 2.5% | 4% | 5.5% | 7.5% |  |

20% ILLIQUIDITY

|  | LEVEL I | LEVEL II | LEVEL III | LEVEL IV | LEVEL V |
|---|---|---|---|---|---|
| CASH |  |  |  |  |  |
| FIXED INCOME | 28% | 8% |  |  |  |
| EQUITY | 34% | 54% | 62% |  |  |
| HEDGE FUNDS | 18% | 18% | 18% |  |  |
| REAL ESTATE | 11.5% | 8.5% | 5% |  |  |
| PRIVATE EQUITY | 8.5% | 11.5% | 15% |  |  |

30% ILLIQUIDITY

|  | LEVEL I | LEVEL II | LEVEL III | LEVEL IV | LEVEL V |
|---|---|---|---|---|---|
| CASH |  |  |  |  |  |
| FIXED INCOME | 5% |  |  |  |  |
| EQUITY | 47% | 52.5% |  |  |  |
| HEDGE FUNDS | 18% | 17.5% |  |  |  |
| REAL ESTATE | 12.5% | 7.5% |  |  |  |
| PRIVATE EQUITY | 17.5% | 22.5% |  |  |  |

† THESE ALLOCATIONS DO NOT INCORPORATE TACTICAL OVERRIDES FOR LIQUID INVESTMENTS. STRATEGIC ALLOCATIONS HAVE A TIME HORIZON OF 3 TO 5 YEARS.
* BASED ON INCOME TAX OF 35%; CAPITAL GAINS TAX OF 15%.

FIG. 5

| LIQUIDITY BY ASSET CLASS | |
|---|---|
| ASSET CLASS | APPROXIMATE LIQUIDITY (AVERAGE NUMBER OF DAYS TO LIQUIDATE) |
| TRADITIONAL | |
| LARGE COMPANY STOCKS | 1-2 |
| US TREASURY BONDS | 1 |
| US CASH AND MONEY MARKET | 1 |
| ALTERNATIVE | |
| HEDGE FUNDS | 90 |
| REAL ESTATE | 5+ YEARS |
| PRIVATE EQUITY | 5+ YEARS |

FIG. 6

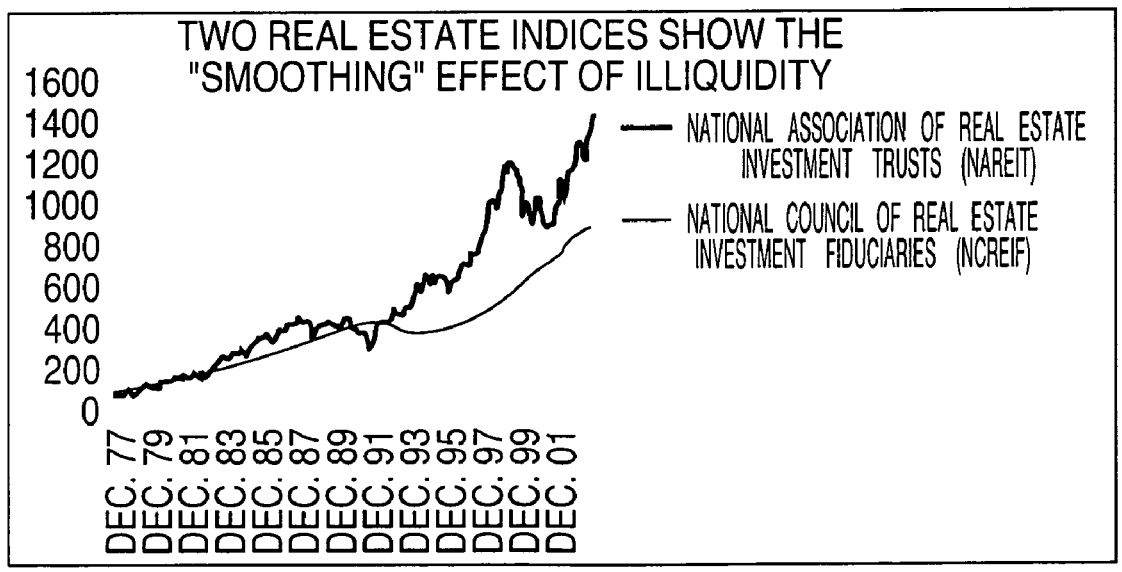

TWO REAL ESTATE INDICES SHOW THE "SMOOTHING" EFFECT OF ILLIQUIDITY
— NATIONAL ASSOCIATION OF REAL ESTATE INVESTMENT TRUSTS (NAREIT)
— NATIONAL COUNCIL OF REAL ESTATE INVESTMENT FIDUCIARIES (NCREIF)

FIG. 7

|  | PRETAX 1 YR RETURN % | VOLATILITY % | AFTER TAX 1 YR RETURN % | AFTER TAX VOLATILITY % |
|---|---|---|---|---|
| CASH | 5.0 | 0.5 | 3.3 | 0.3 |
| BONDS | 6.0 | 7.2 | 3.9 | 7.2 |
| MUNIS | 4.6 | 7.2 | 4.6 | 7.2 |
| EQUITIES | 8.4 | 14.3 | 7.1 | 12.2 |
| HEDGE FUNDS-LOWER RISK | 8.0 | 4.0 | 5.8 | 2.9 |
| HEDGE FUNDS-HIGHER RISK | 10.3 | 9.5 | 7.4 | 6.9 |
| PRIVATE EQUITY | 12.4 | 23.6 | 10.5 | 20.1 |
| PRIVATE REAL ESTATE | 7.6 | 9.9 | 5.1 | 8.2 |

ASSUMPTIONS
INCOME TAX RATE: 35.0%; LT CAPITAL GAIN
AND DIVIDEND TAX RATE: 15.0%
DOES NOT ACCOUNT FOR STATE TAXES

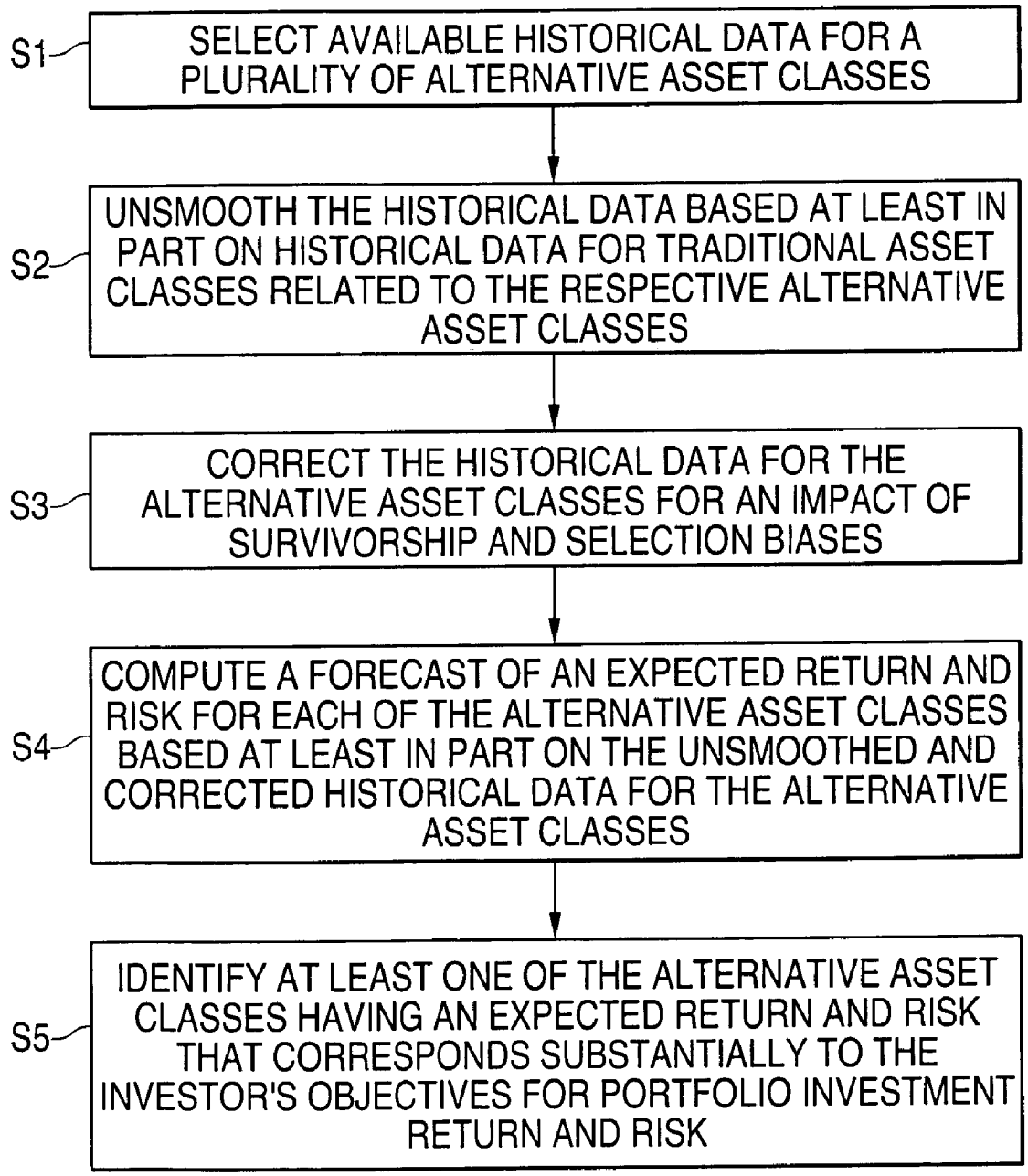

METHOD AND SYSTEM FOR ASSET ALLOCATION

PRIORITY APPLICATION

This application claims the benefit of U.S. Provisional Application No. 60/501,833 filed Sep. 11, 2003, entitled "WHOLE NET WORTH ASSET ALLOCATION", and U.S. Provisional Application No. 60/518,332 filed Nov. 10, 2003, entitled "METHOD AND SYSTEM FOR ASSET ALLOCATION", which are incorporated herein by this reference.

FIELD OF THE INVENTION

The present invention relates generally to a method and system for providing a single, consolidated framework to investors regarding how much of each asset class they should hold. More particularly, but not by way of limitation, the present invention is a method and system for asset allocation that optimizes across virtually all investable asset classes, whether liquid or illiquid, traditional or alternative.

BACKGROUND OF THE INVENTION

The development of modern portfolio theory led to a sea change in the way that investment managers and investors viewed a portfolio of investments. Intelligent decisions were being made about how much of each asset class should be allocated to provide the greatest expected return for the lowest level of risk. The result was a major leap forward in the understanding of investments and a new approach to building portfolios.

Underlying modern portfolio theory, however, were a number of significant assumptions: (1) that asset returns were comparably measured; (2) that levels of liquidity were roughly the same across asset classes; (3) that long histories of performance in these asset classes had been reliably observed; and (4) that both the types and characteristics of risk in these asset classes were similar and well-understood.

These assumptions have served well in the traditional investment world, because they are reasonable approximations of reality for stocks, bonds, and cash. But the financial world is a dynamic one, constantly presenting investors with both new opportunities and challenges. This dynamism has led to a raft of non-traditional or alternative investment products—including hedge funds and illiquid investments such as private equity and real estate vehicles—which investors can access to improve the performance of their portfolios.

The emergence of these new asset classes as an increasingly significant part of many high-net-worth investors' portfolios has also created potential problems. The assumptions that were reasonable for the traditional asset classes are often violated by alternative ones, which can be less liquid, widely disparate in their characteristics and may have poor or inconsistently-recorded historical performance data. The result is that investors are left in a quandary of whether they should take advantage of these investments even though they might not understand them very well. Resolving these questions requires the development of new techniques and tools.

It is difficult to pin down the value of private equity, real estate and other illiquid investments. An innovative holistic system is needed for investors to make intelligent decisions about balancing liquidity needs and the potential for higher returns.

In many investors' quest to moderate risk and increase their portfolios' returns (i.e., the real reasons to diversify), they may have added assets that could throw a portfolio out of balance. The Institute for Private Investors, an educational organization for investors with a minimum of $10 million in investable assets, reports that its average member now has 18% of assets in alternative investments, such as real estate and private equity. In a recent IPI survey, more than 30% of these families said they planned to increase their holdings in real estate and private equity. That trend poses two related problems.

The first is that real estate holdings, credit structures (which purchase bond portfolios and seek to increase yields by borrowing against the assets to buy more securities) and investments in venture capital, leveraged buyouts, and other styles of private equity are illiquid. They typically must be held for years, and because they cannot be bought or sold on demand, it is difficult to determine their exact valuation at any given moment.

That leads to a second problem. It is extremely difficult to include illiquid investments in asset allocation plans. Traditional methods of optimizing a portfolio to fit investors' goals and risk tolerance, which have proven useful in determining percentages of stocks, bonds and cash and in a portfolio, are virtually powerless to handle the very different attributes of illiquid assets.

Treating liquid and illiquid assets as if they were parts of separate portfolios does nothing to answer the question of how much real estate or private equity a particular investor should hold in total. At the same time, sidestepping the liquidity issue and lumping together traditional assets with real estate and private equity ignores basic differences between these two types of holdings. The resulting portfolio can have much more risk than an investor wants.

To appreciate the challenges that need to be addressed, the long-established method for building a portfolio should be considered. In the traditional approach, an advisor helps determine an investor's long-term goals and risk tolerance, and then considers the returns and risks that stocks and bonds have historically produced. Stocks have historically returned 10.2% annually while sometimes suffering sizable losses. Bonds have produced about half the returns of stocks but with much lower risks. Factoring in all the data, the advisor then seeks to create an optimal portfolio with a mix of assets that attempts to provide maximum returns with acceptable levels of risk.

This is an oversimplified description of a process that depends on sophisticated analyses of asset choices as well as on an advisor's judgment and experience. Still, the methodology of traditional asset allocation is well established. However, when illiquid investments are added to the mix, that problem becomes vexing.

Viewed according to the traditional technique of asset allocation, private equity and real estate seem to deserve a heavy weighting in nearly every portfolio. Venture capital investments, for example, have returned almost 17% annually in the past 20 years, according to Thomson Venture Economics.

That is eight percentage points better than the returns achieved by stocks on NASDAQ. And based on some historical measures, venture capital is also less risky, at least in terms of volatility, a measure of how much returns move up and down.

On the basis of those raw numbers, an investor might decide an optimum portfolio would hold most of its assets in venture capital. But there are several reasons why that approach should be tempered. For one, venture funds are more volatile than the data suggest, because of the very different ways stocks and venture capital funds are priced. Stock prices change constantly, and calculations of equities' volatility are based on those minute-to-minute fluctuations. In addition, when markets close, any stock has a measurable value. In contrast, the managers of venture capital funds seldom publish performance data more than once a quarter. Moreover, even that data may represent little more than rough guesses. Because there are no public markets for these investments, venture fund managers must estimate the value of their holdings. The true value of a fund may not be known until the companies in a fund's portfolio have all been sold—perhaps a decade after investors put up their money.

As a result, although venture capital appears to be less volatile than stocks, this is only because those infrequent and imprecise valuations tend to smooth out the rough patches, suggesting that prices are gradually moving higher when, in fact, the value of holdings bounces up and down.

Investment advisors make a recommendation of a mix of assets, e.g., stocks, bonds, cash, that they believe will perform best based on clients' objectives and risk tolerance. Historically, there have been quantitative models which seek to mathematically optimize a portfolio by looking at historical returns among all the different asset classes and then computing the right balance of all those different asset classes based upon the clients' risk tolerance and objectives regarding their portfolio.

There are also qualitative approaches whereby investment advisors will not necessarily undertake significant computational analysis on how a given asset class will perform, but will essentially use their intuition and the economic outlook for a given asset class. The quantitative model, however, is generally considered as the primary basis for making responsible asset allocation recommendations.

As noted above, an issue with the quantitative model is that the ability to make recommendations is typically limited to traditional asset classes, e.g., stocks, bonds and cash. (Hedge funds may sometimes be included, but these are a very gray area). These traditional asset classes generally have a lot of history and good data available, with the exception of hedge funds. It is possible to fairly easily run mathematical models for the past 30 or so years and to be able to make some fairly defensible recommendations about what those asset classes will do and thereby allowing the advisor to construct portfolios that have a relatively high probability of satisfying the investors' objectives.

This quantitative model, however, has been limited to traditional asset classes. High net worth private clients indeed have access to many more products, e.g., alternative investment products and vehicles, not just the traditional asset classes of stocks, bonds, and cash. They have access to hedge funds, private equity, real estate, etc., which are investment classes that are not considered traditional and are not necessarily liquid, which is one of the big criteria of traditional asset classes.

There has not been a model to intelligently and systematically allocate among this larger set of asset classes and between traditional and alternative investments. Therefore, as an example, it is very hard to determine how much private equity, an illiquid asset class, should be held relative to the amount of public equity, a very liquid asset class. There is not a consolidated, single model to do any kind of rigorous optimization among all these asset classes. The models have been limited to just the traditional, or liquid, component of a portfolio.

Accordingly, there is a need for a methodology by which an investment advisor can intelligently recommend a mix of assets to best meet a high net worth investor's objectives and that is consistent with the investor's risk tolerance. More particularly, high net worth individual investors, who are clients at private banks, should intelligently consider untraditional or alternative asset classes—these can be very beneficial to such clients' portfolios.

SUMMARY OF THE INVENTION

It is a feature and advantage of the present invention to provide a methodology and system for determining the best mix amounts of all the different asset classes available to a client, considering his or her situation and tolerance for both market risk and illiquidity.

It is another feature and advantage of the present invention to provide a novel, disciplined approach to understanding how the entire range of investments—including traditional asset classes, hedge funds and illiquid asset classes such as private equity and real estate—might best be incorporated into a portfolio.

It is a further feature and advantage of the present invention to provide portfolio-minded investors an expanded range of investments from which to choose, such as non-traditional asset classes, which can improve diversification in an investment portfolio and offer a better reward-to-risk tradeoff. This means that clients who are willing to accept illiquidity risk—that is, they are willing to place a percentage of their portfolio into assets that cannot be easily transferred into cash—can have higher expected long-term returns for their portfolio, as illustrated in FIG. 1, in which expected returns are higher for 20% illiquidity than for traditional benchmark and still higher for 30% illiquidity.

It is an additional feature and advantage of the present invention to enable investors to consider all of their investable assets in a unified framework and make informed, intelligent decisions about how much of each is appropriate for their objectives. This can be particularly valuable to investors who hold assets for reasons that may not have been initially motivated by the need for portfolio investment. They may own businesses or investment properties for historical or family reasons. Embodiments of the present invention integrate all of these into a single, consolidated financial asset portfolio.

In reference to the present invention, traditional assets, as defined herein, include publicly traded stocks, bonds, and cash. Illiquid assets include private equity, real estate, natural resources, and credit structures. Alternative assets include the illiquid assets mentioned above plus hedge funds and managed futures.

To achieve the stated and other features, advantages and objects, embodiments of the present invention utilize, for example, computer hardware, operating systems, programming languages, software applications, and other technology to provide a method and system for matching an investor's objectives for portfolio investment return and risk with an assessment of a range of expected returns and risks that are likely to be generated by an investment portfolio consisting at least in part of alternative asset classes.

According to an embodiment of the invention, currently available historical data for a plurality of alternative asset classes is selected and unsmoothed, based at least in part on historical data for traditional asset classes related to the respective alternative asset classes. In the process of unsmoothing the historical data, estimates of marked-to-market returns are computed for the alternative asset classes based at least in part on the historical data for the related traditional asset classes. In addition, the historical data for the alternative asset classes is corrected for an impact of survivorship and selection biases, for example, by computing an estimate of the impact of survivorship and selection biases based at least in part on modeling techniques and academic research. Based at least in part on the unsmoothed and corrected historical data for the alternative asset classes, a forecast of an expected return and risk is computed for each of the alternative asset classes incrementally, beginning with lower-risk alternative asset classes and progressing to higher-risk alternative asset classes, and at least one of the alternative asset classes that has an expected return and risk that corresponds substantially to the investor's objectives for portfolio investment return and risk is identified for inclusion in the investment portfolio.

An embodiment of the invention addresses the issue of computing a forecast of expected return and risk for a hedge fund, for example, by computing an estimate of the respective proportions of the return for the hedge fund related to traditional market exposure and those generated by manager skill and computing a forecast of an expected return for the proportion related to the average market exposure based at least in part on a forecast for a traditional equity asset class. Thereafter, a forecast of an expected return for the proportion generated by manager skill can be calculated. In addition, to address issues involved in computing a forecast of expected return and risk, the computation can be adjusted for an impact of fees on expected return, for example, by subtracting fees for a fund-of-funds from the computation of the estimate of return, and the computation can be further adjusted for the impact of taxes on expected return for a taxable investor.

Another aspect of an embodiment of the invention involves computing an estimate of downside risk effect of the alternative asset class on the portfolio, for example, by quantifying the downside risk using value-at-risk (VaR) at a predetermined level of confidence. A further aspect of an embodiment of the invention involves computing estimates for a plurality of expected returns for the alternative asset class at a plurality of levels of risk using Monte Carlo simulation. An additional aspect of an embodiment of the invention involves computing an estimate of one or both of an enhancement effect on return and a reduction effect on risk of a degree of illiquidity of the alternative asset class on the portfolio based, for example, on investment limitations and/or investor constraints imposed by the degree of illiquidity of the alternative asset class on the portfolio.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 2 is a table that illustrates an example of default settings for tracking error that reflect a confidence in forecasts for alternative assets, and which generate robust, well-diversified portfolios across a range of liquidity levels for an embodiment of the invention;

FIG. 5 is a table that shows examples of the approximate liquidity for a selection of investments;

FIG. 6 is a graph that illustrates an example of the impact of smoothing on published returns of alternative assets;

FIG. 7 is a table that shows examples of long-term return and risk assumptions for tax-exempt and U.S. taxable investors; and FIG. 8 is a flow chart which illustrates an example of the process of matching an investor's objectives for portfolio investment return and risk with an assessment of a range of expected returns and risks that are likely to be generated by an investment portfolio consisting at least in part of alternative asset classes for an embodiment of the invention.

DETAILED DESCRIPTION

Figure 1:
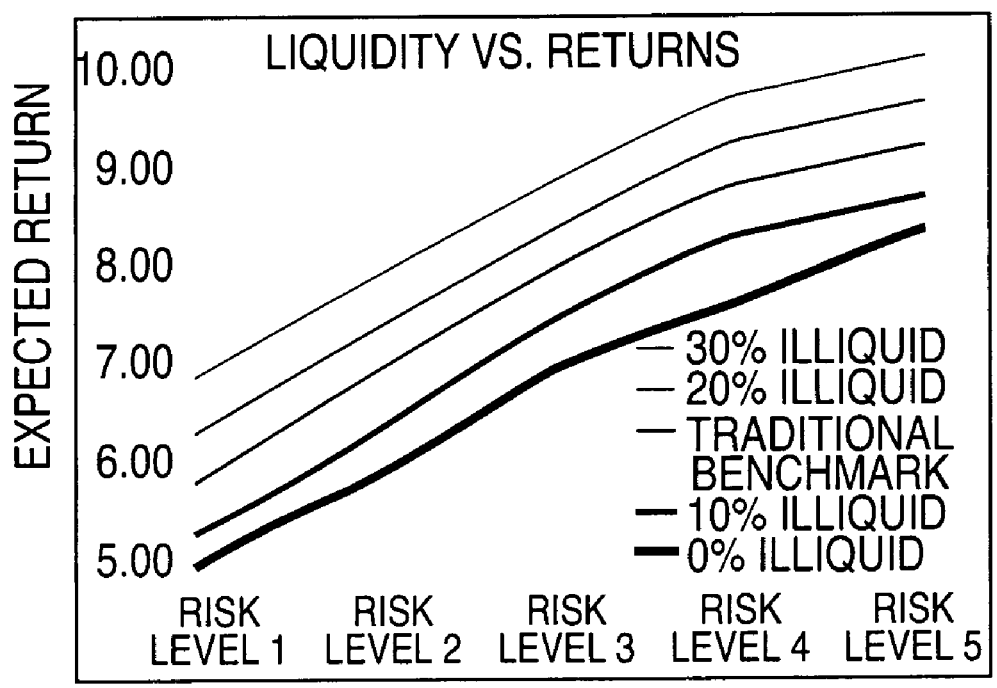
FIG. 1 is a graph that illustrates an example of effects of liquidity risk on long-term investment portfolio returns.

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Referring now in detail to an embodiment of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention.

For instance, features illustrated or described as part of one embodiment can be used on another embodiment to yield a still further embodiment. Thus, it is intended that the present invention cover such modifications and variations that come within the scope of the invention.

An embodiment of the present invention is an asset allocation model that optimizes across virtually all investable asset classes whether liquid or illiquid, traditional or alternative. It provides optimization analysis for alternative and, particularly, illiquid asset classes. Modeling of illiquid asset classes is very difficult for a number of reasons. For exampy, there is little reliable historical data available for illiquid assets. However, parallels can be drawn between the illiquid asset classes and liquid asset classes that permits use of some of the quantitative methodologies that are used for the liquid classes and, thereby, put them on to a level playing field such that they can be used to optimize across all the different asset classes.

Another embodiment of the present invention is a methodology relating to the analytical work behind the optimization routine. The embodiment is the business process to execute the holistic or whole net worth approach to clients' assets. The present invention enables investment advisors to consult with clients not only with regard to stocks, bonds, cash, and possibly hedge funds, but also, to permit consultation regarding the type of real estate holdings, private equity, etc. the clients possess or may wish to consider. For example, if the clients are an owner of their own business or have a lot of rental property, these assets have been very difficult or impossible to model and make asset allocation recommendations that take them into account.

An embodiment of the present invention combines inputs and techniques to build robust and rational portfolios. Much progress has been made toward a better understanding of alternative assets, however, there is not the same degree of confidence in the ability to predict the behavior of alternative assets in an investor's portfolio. When whole net worth portfolios are built, consideration is made of the different levels of confidence between traditional and alternative assets. This relative confidence consideration is an important component in an embodiment of the present invention.

A further embodiment of the present invention relates to the framework employed for building whole net worth portfolios. The framework starts with techniques that have proven effective for traditional assets. These techniques make tradeoffs between the expected return and risk of each asset class in such a way that a diversified portfolio is built with the highest expected return for a level of risk that is acceptable to the investor. Experience has shown that portfolios of traditional asset classes built this way tend to perform according to expectations over long periods of time (although past performance is not indicative of future results).

A challenge is to integrate alternative asset classes into this approach in such a way as to realize the advantage of the benefits offered by alternative assets while preserving the robust and effective characteristics of established asset allocation techniques. A method used to accomplish this is called risk budgeting. Risk budgeting involves looking at the main sources of risk in a portfolio, and budgeting (or accounting) for them in an intuitive and practical way.

An embodiment of the present invention involves dividing portfolio risk into two main parts: the part generated by traditional assets and the part from alternative assets. The proportion of risk coming from each of these two sources is determined by the investor's objectives, the forecast return and risk of the asset classes, and the investor's confidence in those forecasts.

In accordance with the present invention, risk budgeting is measured and controlled using tracking error. Tracking error is a way of measuring how closely two portfolios perform or track each other over time. A low level of tracking error means the two portfolios perform similarly, and most likely have a lot of the same underlying constituents. A high level of tracking error means the two portfolios perform differently, and may have very different constituents. Tracking error is often used to compare a portfolio with its benchmark.

In a further embodiment, tracking error is used to determine the level of alternative assets in the following way. Starting with a benchmark of traditional assets, a new portfolio combining traditional and alternative assets is built which has similar overall risk (as measured by volatility) to the benchmark. Because alternative assets—which either reduce risk by adding diversification or enhance expected returns at the same level of risk—have now been included and the risk has been kept constant, this new portfolio will have a somewhat higher expected return than the benchmark. Limiting the tracking error of the new portfolio relative to the benchmark preserves the robust structure of a benchmark based on traditional assets. The more confidence an investor has in the forecasts for alternative assets, the more comfortable he or she is with a higher level of tracking error. Greater tracking error will typically lead to higher allocations to alternative assets, or within alternative assets, a shift toward riskier alternatives. Higher tracking error allocates more of the risk budget to alternative asset classes.

It is assumed that investors with a higher overall tolerance for risk will be more tolerant of the additional uncertainties of alternative asset classes. In an embodiment of the present invention, the level of tracking error is increased for portfolios with higher risk. Default settings have been determined for tracking error that reflect the confidence in the forecasts for alternative assets, and which generate robust, well-diversified portfolios across a range of liquidity levels as illustrated in FIG. 2. Furthermore, an added benefit of this approach is that it allows investors to incorporate their own views about how particular assets will perform in a systematic and elegant way, linking, explicitly, long-term strategic and shorter-term asset allocation in a single framework.

Downside risk and liquidity are two different aspects of an investment, although they both relate to the investor's time horizon. Investors with short time horizons might avoid highly risky assets because they would risk losing a significant proportion of value over intermediate periods. Investors with short investment horizons should also avoid illiquid assets because the funds will be inaccessible for many years. Suitable investments for investors with a short time horizon include low-risk liquid assets such as cash and short-term bonds. Because of the tendency for low-risk investors to have short time horizons, illiquid assets are normally excluded from the low risk portfolios. If special investor considerations apply, however, illiquid assets can be included in low risk portfolios.

Just as with forecasting, the emergence of new asset classes also requires the development of new approaches to constructing portfolios. There are three major issues which must be addressed: First, the fact that the types of risks one has in these asset classes are different from those of traditional assets; second, that the degree of confidence in the forecasts might vary across asset classes, even after correcting for many of the biases in measuring returns in alternative assets; and finally, that the degree of illiquidity varies across asset classes.

In the early days of modern portfolio theory, risk was measured as the standard deviation of returns. It was assumed that the return pattern of financial instruments could be described by a bell-shaped curve or normal distribution centered on the average expected return. Financial analysts have been aware that this was only an approximation of reality, and that some instruments followed this pattern more closely than others. With increasing interest in derivative instruments (such as options) and alternative investments, it has become clear that, for those investments, the normal distribution did not fully describe their investment returns, and that standard deviation alone was not a sufficient measure of risk.

Figure 3:
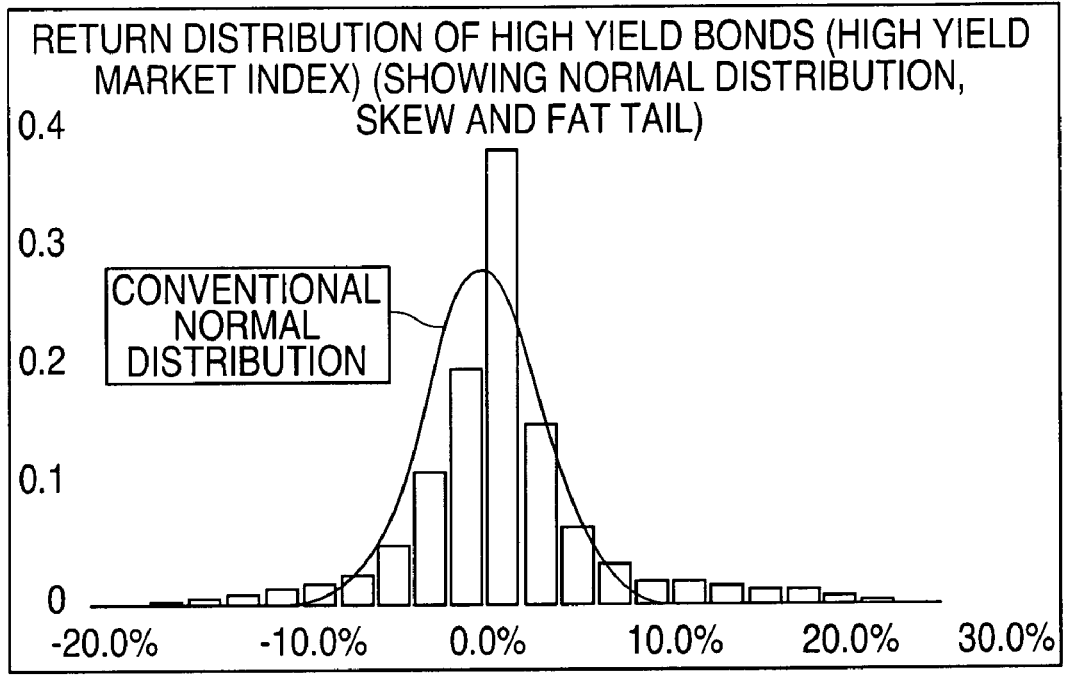
FIG. 3 is a graph that illustrates an example of return distribution for high yield bonds, which have a negative skew and demonstrate kurtosis.

FIG. 3 shows the return distribution for high yield bonds. Although high yield bonds are not usually considered an alternative asset class, their return distribution has similar properties to some alternative assets. Two important ways that investments can deviate from a normal distribution is if they have either a skew or fat tail (also known as kurtosis). A skew means that returns are distributed unevenly around the average return. In a normal distribution, precisely 50% of the returns are above average, and 50% are below average. If the distribution is skewed, there will be a greater probability of achieving returns that are consistently above or below average returns. As illustrated in FIG. 3, high yield bonds have a negative skew. The bars to the left of the highest bar (the mode) are higher (greater probability) than the bars to the right. High yield bonds are more likely to experience returns below the average. Kurtosis means that the likelihood of experiencing an extreme return is greater than would be the case for a normal distribution. This is sometimes called event risk because assets with a meaningful (albeit usually small) probability of an extreme event—such as default—exhibit kurtosis. High yield bonds in FIG. 3 demonstrate kurtosis: the bars at both ends of the distribution are significantly higher than the normal distribution.

Figure 4:
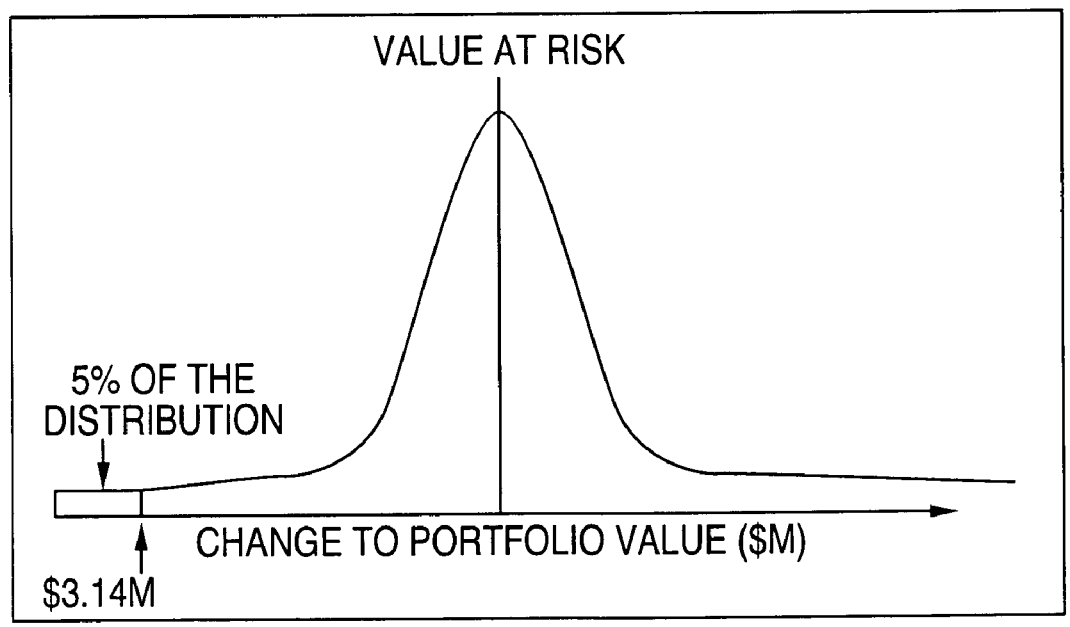
FIG. 4 is a graph that shows an example of a $100 million portfolio with VaR of $3.14 million at a 95% confidence level.

Investors tend to be most concerned with the risk of losing money, or downside risk. They tend not to view unexpectedly positive returns as a "risk," while statistically speaking, they are. When the return pattern of investments is not symmetrical, then it is important that the way risk is measured emphasizes what matters to investors, namely downside risk. There are a number of ways to measure downside risk. One popular way is called value-at-risk (VaR), which quantifies the expected loss (in monetary units or as a percentage of value) at a specified level of confidence (probability). FIG. 4 shows an example of a $100 million portfolio with VaR of $3.14 million over the next year at a 95% confidence level. This means that there is a 95% probability that the portfolio will not lose more than $3.14 million over the next year. VaR is used in the management of credit portfolios, which are subject to skew and kurtosis. The approach that is being followed similarly considers the effects of downside risk on the portfolios.

When skew and kurtosis are taken into consideration, the problem of building portfolios becomes more complex. Standard tools that build 'efficient' portfolios based only on expected return, standard deviation and correlation can no longer be used. Although these are still inputs, a technique called Monte Carlo simulation, which is well-known in the financial community, although not yet part of the standard asset allocation toolset is used. In using Monte Carlo simulation, for each asset class, forecasts are made of expected return, standard deviation, skew and kurtosis, in addition to forecasts of how the asset classes move together, represented by their correlation. Then, based on those inputs, Monte Carlo simulation maps out tens of thousands of hypothetical yet plausible return paths for each asset class. Finally, looking at all of these simulated outcomes, it is possible to assess which portfolio allocations provide the highest return given a particular level of risk.

As noted there are challenges with forecasting return and risk for alternative asset classes in general. Illiquid asset classes raise a number of additional issues. Liquidity should not be thought of in black and white terms. Different asset classes have different average levels of liquidity, and for specific investments within a particular asset class, there may be a wide range of liquidity. FIG. 5 shows the approximate liquidity for a selection of investments.

The special factors that need to be taken into account when investing in illiquid assets may be divided, for example, into two categories: limitations on investment, and constraints on investors.

Illiquid assets cannot be traded in the short term, which means portfolios containing them cannot be fully rebalanced on a regular basis. This inability to rebalance has important consequences. First, the portfolio will tend to drift away from targeted return and risk levels. Over time, the portfolio may become more or less risky than desired. Second, the proportion of portfolio value that is illiquid will drift over time. An initial illiquid allocation of, for example, 20% could change substantially, depending on the relative returns of the different asset classes. Third, it is difficult for investors to respond to new and unfavorable information about an illiquid asset class, or about a specific investment in an illiquid asset class. Even if investors have new information they believe can add value, they will usually be unable to exploit it. In short, an inability to rebalance reduces the investor's ability to predict or control the investment outcome.

Illiquid investment also imposes constraints on investors' behavior. Illiquid assets are not accessible to fund new, unpredicted spending requirements. While investors may be able to borrow against illiquid assets, the interest rate will vary from one investor to another, and borrowing raises the investor's risk profile by leveraging the portfolio. Also, illiquid assets may not be divisible, meaning that it may be difficult for the investor to access some of the money in particular investments. Because of the limitations and constraints described, illiquid assets must offer either return enhancement or risk reduction relative to liquid assets in order to make them viable opportunities for astute investors. In many cases, they can offer both.

The characteristics of illiquidity, especially limited accessibility of funds, make it extremely difficult to consider liquidity levels against risk and return in a strictly quantitative framework. In other words, advisors can no more tell investors what the "right" level of liquidity is for them than they can say what the right level of risk is. While advisors can show tradeoffs between liquidity, return and risk, and make suggestions given the investor's circumstances, an acceptable level of liquidity is ultimately a decision specific to each investor.

A well-designed investment program matches the investor's needs with a realistic assessment of the range of returns that are likely to be generated by an investment portfolio. Broadly, investors take two steps when constructing a portfolio. First, they need appropriate inputs. In asset allocation, these are assessments of how particular types of assets (asset classes) are expected to perform. One of the key elements of this step is that forecasts for different asset classes must be tied together, or integrated using a consistent framework. Once one has a view on how the asset classes should perform, the next step is to combine the assets in a sensible way, given their characteristics and the objectives of the investor. An embodiment of the invention includes as part of its implementation process, a determination of each investor's appropriate level of illiquidity.

As mentioned, the emergence of alternative asset classes poses significant challenges for forecasting. Building a portfolio requires forecasts of return, risk and correlation for each of the asset classes under consideration. What is critical in forecasting is ranking asset classes in terms of the parameters: expected return, risk and correlation. In order to rank effectively, there needs to be comparable ways of viewing each asset class. This is a central challenge of asset allocation: investors want to hold a variety of asset classes because they have diversifying return patterns, yet building robust portfolios requires these inherently different asset classes to be compared to one another.

In accordance with an embodiment of the present invention, in order to compare asset classes, a modular forecasting process is employed. Return forecasts for each asset class are computed incrementally, starting with low-risk asset classes, and progressing to higher-risk classes. This approach emphasizes the structural differences between asset classes that bear on each one's risk profile. As part of the present invention this framework has been extended to include alternative asset classes.

Understanding asset classes, and being able to forecast their behavior in terms of long-term return and risk requires knowledge of the underlying economic drivers of asset class returns as well as historical data. Historical data helps confirm economic intuition; in other words, did the asset class behave as we would have expected in a particular economic environment? Historical data also helps calibrate forecasts. For example, economic theory says that stocks should be riskier than bonds, and history helps calibrate how large investors should expect the difference in risk to be.

Traditional asset classes have a great deal of historical data—one to two hundred years of returns in most cases. While some alternative assets are old and others are new, there is much less performance data available on them. This makes it more difficult to correlate economic drivers to returns, and harder to calibrate and compare forecasts of alternative assets against traditional asset classes. Only with the passage of time, and a meaningful accumulation of alternative asset return data, can this challenge be overcome.

Another data issue which affects illiquid assets is that, because they trade infrequently, it is difficult to establish fair market prices between transactions. This problem can be complicated further by the fact that managers often have discretion in how they value their holdings. Typically, illiquid investments are repriced using periodic appraisals, which tend to artificially lower both the volatility of returns and the correlations with other asset classes. In order to make risk and correlation forecasts comparable for liquid and illiquid assets, a key requirement for asset allocation, proprietary techniques are applied to more effectively estimate "marked-to-market" returns. This is done by looking at the behavior of related traditional asset classes, and making suitable corrections—a process called "unsmoothing."

FIG. 6 provides an example of the impact of smoothing on the published returns of alternative assets. It compares the published returns of two different ways of accessing the U.S. real estate market: real estate investment trusts, or REIT'S, which are liquid investment vehicles that trade on the New York Stock Exchange; and pooled privately-held real estate funds that are not very liquid (the smoother of the two curves). Both vehicles hold real estate as the underlying asset, yet the risk appears to be quite different based on the published data. The volatility appears to be much lower for the privately-held funds because their valuations are supplied by appraisals rather than market trades. The new approach makes the necessary corrections to—or "unsmoothes"—the data so that asset class return and risk can be compared in a fairer and unbiased way.

Two potentially serious distortions that can affect historical data are survivorship and selection bias. Survivorship bias occurs when the data collector removes particular investments (companies, properties, or funds) from the database, and reports only the performance of the "survivors." There are many reasons why a data collector may drop an investment from a database: the investment may be bankrupt or failed; it may have merged; it may become uneconomic to continue collecting the data for a particular investment, and so on. Whatever the reason, the end result is usually an upward bias in the average returns of the remaining investments because many of the worst investments are no longer in the database. Since failure is an ongoing risk in most asset classes, the investor's true opportunity set should include all investments, including those that failed.

Selection bias occurs when, for example, a hedge fund operator waits until the fund's performance is acceptable before allowing it to be collected in a database. If the fund performs poorly, the operator may never report it to any database. On the other hand, selection bias can also occur because the best funds may choose not to report their results in the index. In all of these cases, all funds that have outside investors should be reflected in the opportunity set of investors, including those which choose not to report to a database.

Survivorship and selection bias affect most new investment categories. Hedge funds, one of the newest forms of investment, are especially prone to these biases. In contrast, mutual fund databases have a very low incidence of these biases. That is because mutual funds are legally required and competitively motivated to report performance, which eliminates selection bias, and many of the databases retain data on failed funds because the investment community recognizes its value.

Hedge fund databases have begun to retain data on failed funds, although selection bias is still an issue. Using both proprietary modeling techniques and academic research, in an embodiment of the present invention, the impact of survivorship and selection biases on hedge funds is estimated and incorporated in forecasts.

Most alternative asset classes lack investable benchmarks. This means that it is difficult and expensive for investors to obtain a well-diversified and representative exposure to these asset classes. The difficulty is compounded for small investors. The problem arises for alternative assets because of the heterogeneous nature of the individual investments that make up these asset classes. While many thousands of investors can buy shares in a particular large or mid-sized company, only a relatively small number of investors can buy an ownership stake in a single building or a specific venture capital or buyout fund. This makes a broadly-available, truly representative index difficult to construct.

A key implication of this for asset allocation is that it reduces confidence in an investor's ability to capture the returns that have occurred—and make forecasts of what will occur—for alternative asset classes. Investors can structure their holdings in alternative assets to gain broad exposure, but the divergence in performance versus a published index (known as tracking error) will be much higher than with most equity or bond funds versus their indices.

Forecasting returns for hedge funds is particularly difficult. Many of the problems with historical data mentioned above apply, but there is another layer of complexity: since they are actively managed, hedge funds have a great deal of flexibility to change their investment strategy. This makes it impossible to know if the forecasts incorporate the right assumptions about how a particular fund may invest.

Hedge funds are actively managed investments in financial assets. Most hedge fund strategies generate returns from two sources: exposure to a market, such as the stock or credit markets, and active returns from timing markets or selecting securities within a market.

As mentioned earlier, a key to ranking asset classes by forecast return is to make the forecasts of each asset class comparable. If the portion of return generated by market exposure can be isolated, that is a first step toward comparability. Statistical techniques enable estimates to be formed of how much the returns of a particular hedge fund strategy are related to average market exposure, and how much are generated through manager skill. If, for example, on average, one-half of the return from a hedge fund comes from exposure to the stock market, then for that portion of the hedge fund forecast, assumptions should be used that are consistent with the forecast for the equity asset class. Then a separate forecast for the portion of return coming from active management can be formed. Finally, the market forecast can be combined with the active management forecast to generate the overall forecast.

One complication is that, because hedge fund investment strategies are highly flexible, average market exposures and active-management returns may shift over time. It has been determined that market exposures are fairly stable in the medium term for most, although not all, of the strategies. The level of active return is quite variable in all strategies, however. The possibility that managers will change strategies and the variable level of active management return both reduce confidence in the return forecasts for hedge funds.

Up to this point, the discussion of return forecasting has been from the perspective of a hypothetical, very large and tax-exempt investor. For investors of small-to-medium size, and for taxable investors, the return assumptions need to be modified in order to make the asset classes comparable.

If investment managers charged the same fee for every asset class, and if that fee were relatively small, then for practical purposes, investors could ignore fees when building portfolios because they would not affect differences between asset classes. In asset allocation for traditional asset classes, fees are generally ignored because investors, if they wish, can access these markets with index funds that have relatively low fees. If an investor is planning to use active managers, this stage of the asset allocation exercise excludes expected excess returns net of fees. They are taken into account in a later stage of the analysis.

When alternative assets are added to the portfolio, fees must be taken into consideration because they are much higher than fees on traditional assets.

The only way for small or medium size investors to gain diversified, representative exposure to alternative assets is through fund-of-fund vehicles. These are commingled funds that invest, for example, in several hedge funds, or in a number of private equity or real estate partnerships. Fund-of-funds offer two potential benefits. First, they can be designed to offer diversified exposure to the asset class, although not all fund-of-funds attempt to do this. The second potential benefit is the possibility of returns from active management above the asset class benchmark. For these hoped-for benefits, fund-of-funds charge a layer of fees on top of the fees levied by each individual fund holding.

Because a fund-of-funds vehicle may be the only way for smaller investors to access alternative asset classes with any meaningful degree of diversification, these benefits are true value-added for the investor. The only other options are to gain undiversified—and potentially very risky and very biased—exposure via a few highly concentrated holdings or to forego investment in that asset class altogether (which may be preferred in certain cases).

Ideally, only the portion of the fund-of-funds fee that is needed to structure a diversified exposure to the asset class is deducted, but in practice it is difficult to separate the diversification piece from the active management piece. Alternative asset class return forecasts are adjusted by subtracting estimated total fees for fund-of-funds vehicles.

For taxable investors, the impact of taxes on expected returns varies dramatically for different types of alternative assets. Hedge funds tend to trade a lot, so most of their returns are short-term and taxable at relatively high rates. At the other end of the tax spectrum, some private equity funds generate most of their returns as long-term capital gains. FIG. 7 shows long-term return and risk assumptions for tax-exempt and U.S. taxable investors.

In a further embodiment of the present invention, a primary challenge is to assign realistic valuations and volatility levels to illiquid investments, so that they become easier to contrast against traditional assets such as stocks and bonds. In some cases, a direct comparison between public and private holdings provides a rough guide. For example, if the public markets drop 20%, private companies will probably do poorly too.

In a further embodiment, with an understanding of how liquid and illiquid investments actually perform in relation to each other, and of the quantitative tradeoffs between liquidity and return potential, a liquidity questionnaire is developed. It attempts to provide a general sense of a client's tolerance for illiquidity, in much the same way a risk-tolerance questionnaire probes an investor's ability to tolerate market fluctuations.

Still another problem of using illiquid investments is the difficulty of rebalancing portfolio allocations to different asset classes over time. By definition, such investments are difficult to sell, and there is no simple way to adjust allocations of illiquid assets to keep them in line with portfolio targets. But there are pragmatic approaches that could achieve similar results. An investor might initially buy less of an illiquid investment than the target allocation suggests, then allow the investment to grow slowly. That way, the illiquid allocation would match the target on average. Or a client could move into real estate or private equity gradually. For example, an investor plans to put $3 million into a private equity fund. Instead of moving all of the money in at once, capital calls might require the investor to invest over time, perhaps $500,000 each year for the next six years. Before the investor has completed the total $3 million investment, the investor might begin receiving cash distributions that the fund might generate as profits are realized. The investor could then reinvest the proceeds or hold them back to limit the allocation.

A further embodiment of the present invention is an asset-allocation model that helps make decisions more objective, balancing investors' needs for liquidity against their pursuit of higher potential returns.

Another embodiment of the present invention is a system that presents two sets of recommended portfolios: one for U.S. taxable investors and one for non-U.S. taxable investors. Within each set there are five levels of risk-return objectives—from full capital preservation (lowest risk) to maximum capital growth (highest risk).

There is the added dimension of illiquidity. In a further embodiment, the recommended portfolios provide up to four levels of illiquidity: zero, 10%, 20% and 30% for each level of risk. As with the risk levels, the liquidity levels are selected based on an investor's unique objectives and tolerance for illiquidity. There is not one absolute recommended liquidity level for a given level of risk (except risk level 1, which does not allow any illiquid assets and thus contains only one recommended allocation). The illiquid asset classes are categorized as private equity, including sub-classes such as venture capital, leveraged buyout and natural resources, and real estate.

Illiquid assets, by their very nature, are impossible to rebalance regularly. One cannot easily reduce a position at any given time, and building a position is usually subject to discrete windows of opportunity. Therefore, in a further embodiment, the illiquid allocations will not be rebalanced, for example, each quarter the way liquid assets are. They will, however, be reviewed and considered in the ongoing liquid asset class rebalancing, as the two bear on each other.

FIG. 8 is a flow chart which illustrates an example of the process of matching an investor's objectives for portfolio investment return and risk with an assessment of a range of expected returns and risks that are likely to be generated by an investment portfolio consisting at least in part of alternative asset classes for an embodiment of the invention. Referring to FIG. 8, at S1, available historical data is selected for a plurality of alternative asset classes. At S2, the historical data is unsmoothed based at least in part on historical data for traditional asset classes related to the respective alternative asset classes. At S3, the historical data for the alternative asset classes is corrected for an impact of survivorship and selection biases. At S4, a forecast of an expected return and risk for each of the alternative asset classes is computed based at least in part on the unsmoothed and corrected historical data for the alternative asset classes. At S5, at least one of the alternative asset classes having an expected return and risk that corresponds substantially to the investor's objectives for portfolio investment return and risk is identified for inclusion in the investment portfolio. The following is a hypothetical case study that illustrates an example of the process of matching an investor's objectives for portfolio investment return and risk with an assessment of a range of expected returns and risks that are likely to be generated by an investment portfolio consisting at least in part of alternative asset classes for an embodiment of the invention.

Case Study:
Structuring Investment Solutions in a Whole Net Worth Framework*

Whole Net Worth Case Study – US Client

Whole Net Worth
A framework for your investment goals

Benefits

▶ Our proprietary Whole Net Worth model addresses a critical problem faced by high-net-worth clients and their advisors: how to allocate intelligently among the wide array of available investment asset classes – whether liquid or illiquid.

▶ Designed specifically for clients of the Private Bank by the analytical teams at Asset Management and Alternative Investments, Whole Net Worth provides optimized allocation recommendations that incorporate virtually all major asset classes, including illiquid assets such as private equity and real estate.

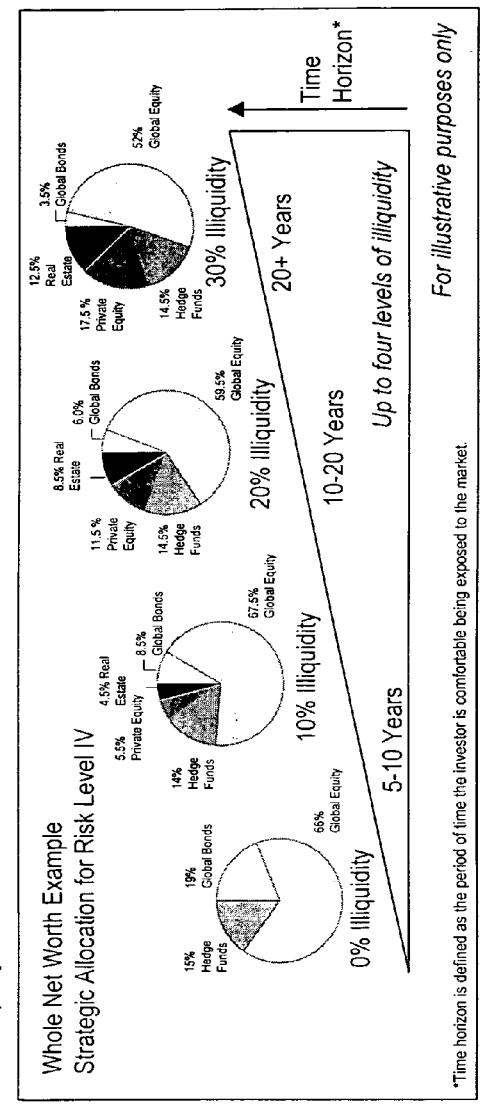

Whole Net Worth Case Study – US Client

Whole Net Worth
A Four-Step Process

1 Analyze the risk and return characteristics of the client's portfolio using the six broad asset classes of cash, fixed income, equities, hedge funds, private equity and real estate.

2 Identify the investor profile: investment objective, risk level and allocation to illiquids.

3 Evaluate the client's current portfolio at the broad asset class level versus Private Bank's Whole Net Worth optimized allocations.

4 Propose a target allocation to meet investor's risk, return and illiquidity preferences.

Whole Net Worth Case Study – US Client

Analyze Risk and Return Characteristics
Example of a Whole Net Worth Evaluation

Portfolio Characteristics

| Asset Allocation | |
|---|---|
| Cash | 0.0% |
| Fixed Income | 12.0% |
| Equities | 70.0% |
| Hedge Funds | 5.0% |
| Private Equity | 13.0% |
| Real Estate | 0.0% |

| Risk and Return Metrics[1] | |
|---|---|
| Expected Return | 8.0% |
| Expected Risk (Standard deviation) | 13.6% |
| Sharpe Ratio[2] | 0.36 |
| Downside Risk[3] | -2.2 |
| Probability Below 0% | 28.7% |
| Average Shortfall Below 0%[4] | -7.6% |
| Hypothetical Worst Case Return[5] | -20.1% |

*For illustrative purposes only*

1. The forecasted return and risk estimates are calculated at the broad asset class level using a methodology that derives returns, volatilities and correlations by using market observations and a variety of statistical methods based on our estimates and assumptions. As such, although we believe our methodology to be sound, it is subject to a high degree of uncertainty and therefore does not guarantee future results.
2. A risk-adjusted measure calculated by dividing the portfolio's expected return minus the risk-free rate of 3.1% by its expected risk.
3. The   Private Bank Proprietary Downside Risk estimate is calculated by multiplying the Probability Below 0% by the Average Shortfall Below 0%.
4. The average of the negative returns.
5. The average of the lowest 1% of the estimated returns.

Observations

▸ Upon reviewing the benefits of Whole Net Worth, the client agrees to present his holdings held elsewhere so we can provide complete holistic portfolio analysis.

▸ The client's allocation with the    Private Bank of $15MM is well diversified in liquid investments.

▸ Held away assets of $10MM in fixed Income, US equity and private equity are incorporated into the analysis.

Goal

▸ The client confirms that he is interested in diversifying his US equity position as well as expanding his illiquid positions over time.

▸ The client will consider transferring their assets held elsewhere to    Private Bank to be reinvested for diversification.

Expected returns and risks do not guarantee future results.

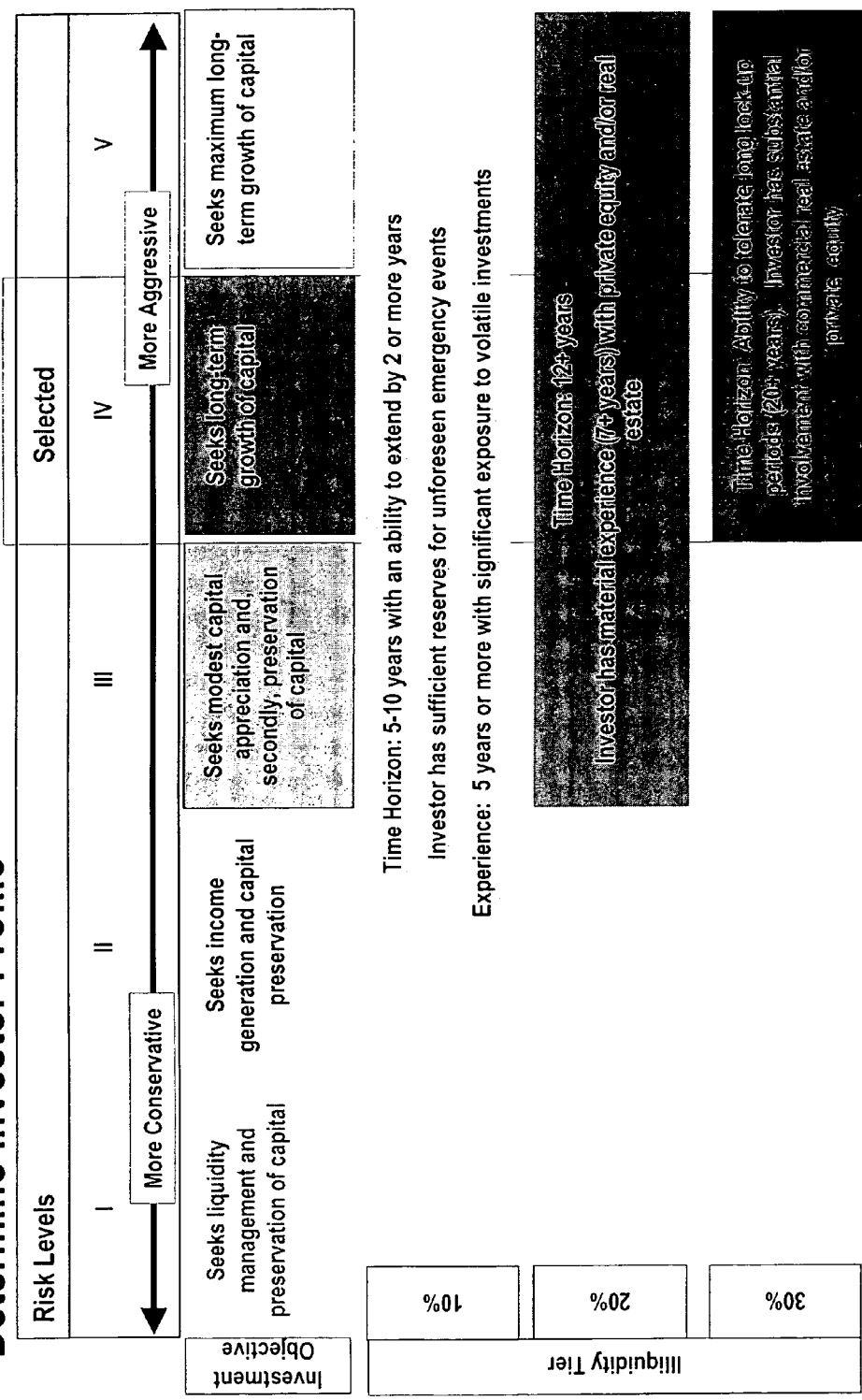

Evaluate the Client's Current Portfolio

Comparing Allocations

▲ Upon reviewing his asset allocation and investment objectives versus our recommended Whole Net Worth allocations, the client selected a risk level of IV and a tolerance of up to 20% illiquidity.

▲ Due to our WNW methodology which is designed to better capture non-normal return characteristics, downside risk estimates are used rather than traditional measures of risk such as standard deviation.

▲ The CPB level IV-20% illiquid provides an expected return similar to the client's current portfolio with and an improved risk profile.

| Investor Profile based on Client's Current Portfolio | |
|---|---|
| Time Horizon: | 12+ years |
| Illiquid Exposure: | 13% |
| Maximum Annual Loss: | 20 - 25% |
| Objective: | Seeks long-term growth of capital |

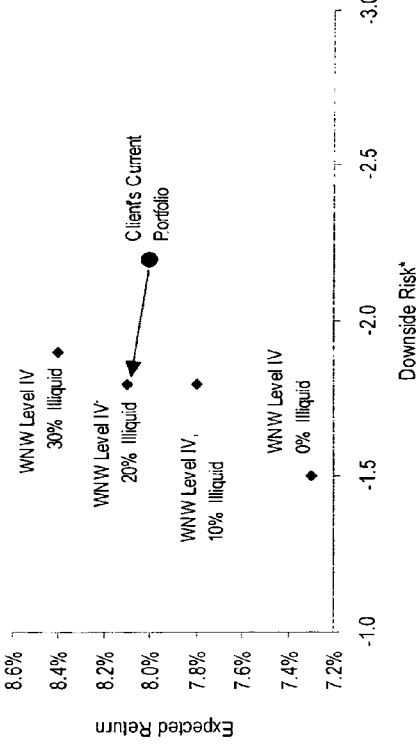

* The CPB Downside Risk estimate is calculated by multiplying the Probability Below 0% by the Average Shortfall Below 0%. Average shortfall represents the average of the negative returns. The client's current allocation assumes diversification at the broad asset class levels and diversification within asset classes.

For illustrative purposes only. Expected returns and risks do not guarantee future results.

Propose a Target Allocation

Client's Current Portfolio

Applying the Whole Net Worth approach to a client's investments provides a comprehensive framework to evaluate their holdings across broad asset classes (cash, fixed income, equity, hedge funds, private equity and real estate). In this case, by aggregating the client's holdings we observe that hedge funds are limited and there is currently no exposure to real estate.

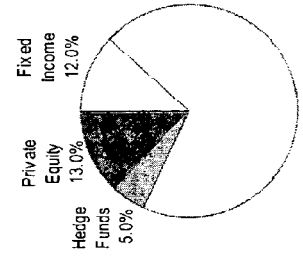

| Forecast Statistics | Client's Current Portfolio |
|---|---|
| Expected Return | 8.0% |
| Expected Risk (Standard Deviation) | 13.6% |
| Sharpe Ratio (Risk free rate = 3.1%) | 0.36 |
| Downside Risk | -2.2 |
| Probability Below 0% | 28.7% |
| Average Shortfall Below 0% | -7.6% |
| Hypothetical Worst Case Return | -20.1% |

Proposed Allocation – Level IV 20% Illiquid

A model allocation to meet investor's specific risk and return preferences at a defined liquidity level is selected (Level IV, 20% illiquid). Here, the goal is to reduce risk and maintain return expectations. Within asset classes, analysis is required to ensure risk is reduced through diversification strategies.

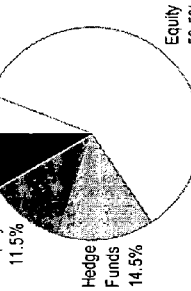

| Forecast Statistics | Proposed Model Portfolio | vs. Current |
|---|---|---|
| Expected Return | 8.1% | +0.1% |
| Expected Risk (Standard Deviation) | 12.6% | -1.0% |
| Sharpe Ratio (Risk free rate = 3.1%) | 0.40 | +0.04 |
| Downside Risk | -1.8 | -0.4 |
| Probability Below 0% | 26.4% | -2.3% |
| Average Shortfall Below 0% | -6.9% | +0.7% |
| Hypothetical Case Return | -18.2% | -1.9% |

For illustrative purposes only. Expected returns and risks do not guarantee future results.

Comparing Risk of Capital

Observations

- In comparing portfolios, the client can observe that the proposed model portfolio has a reduced potential loss of capital.

- To quantify the potential loss of capital, we take the product of the average of the lowest 1% of estimated returns and the initial investment amount.

- By further diversifying the client's current allocation to a Level IV – 20% illiquid model, we expect the model portfolio to reduce the potential loss of capital.

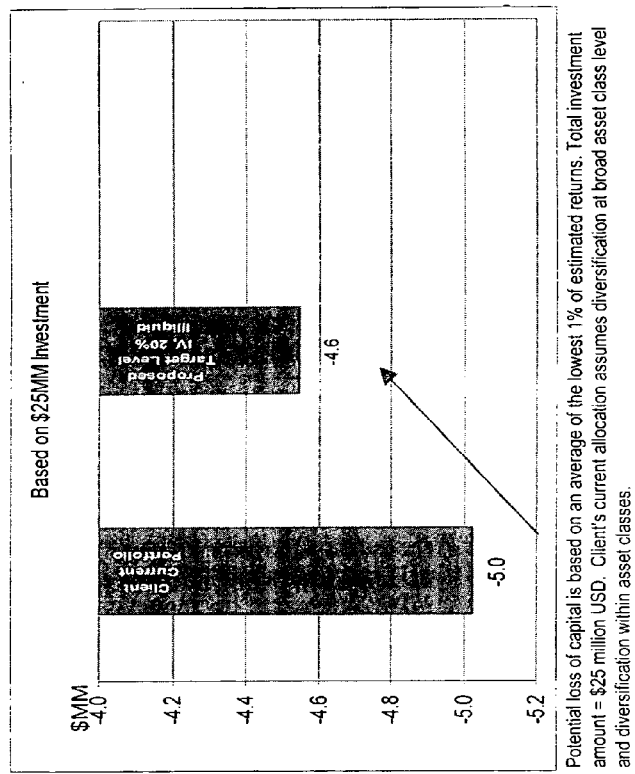

Potential Loss of Capital

Potential loss of capital is based on an average of the lowest 1% of estimated returns. Total investment amount = $25 million USD. Client's current allocation assumes diversification at broad asset class level and diversification within asset classes.

For illustrative purposes only. Expected returns and risks do not guarantee future results.

Propose a Target Allocation
Comparison of Client's Current Portfolio versus Proposed Model Allocation

Suggested Adjustments

▲ The client should reduce his allocation in bonds and equities and allocate the proceeds to hedge funds and real estate.

▲ He should diversify away his concentration in US equity to a globally diversified allocation.

▲ The addition of diversified real estate and hedge funds should also help reduce the overall risk of the portfolio.

| | Client's Current Portfolio | Proposed Allocation | Required Adjustments |
|---|---|---|---|
| Cash | 0.0% | 0.0% | 0.0% |
| Total Cash | 0.0% | 0.0% | 0.0% |
| Short-Term Bonds | 2.0% | 0.0% | -2.0% |
| US Bonds | 3.0% | 1.5% | -1.5% |
| World Ex-US Bonds | 5.0% | 2.5% | -2.5% |
| High Yield / Emerging | 2.0% | 2.0% | 0.0% |
| Total Fixed Income | 12.0% | 6.0% | -6.0% |
| US Large-Cap Equities | 57.7% | 23.5% | -34.2% |
| US Mid-Cap Equities | 10.6% | 3.5% | -7.1% |
| US Small-Cap Equities | 0.2% | 3.5% | 3.3% |
| European Equities | 0.2% | 19.0% | 18.8% |
| Japanese Equities | 0.1% | 5.5% | 5.4% |
| Asia/Pacific Equities | 0.0% | 1.5% | 1.5% |
| Emerging Market Equities | 1.2% | 3.0% | 1.8% |
| Total Equities | 70.0% | 59.5% | -10.5% |
| Lower-Risk Hedge Funds | 0.0% | 0.0% | 0.0% |
| Higher-Risk Hedge Funds | 5.0% | 14.5% | 9.5% |
| Total Hedge Funds | 5.0% | 14.5% | 9.5% |
| Total Private Equity | 13.0% | 11.5% | -1.5% |
| Total Real Estate | 0.0% | 8.5% | 8.5% |
| Grand Total | 100.0% | 100.0% | |

For illustrative purposes only.
Note: Asset allocation for the proposed model portfolio is determined by the Private Bank's Investment Policy Committee. The allocation is constructed using a methodology that attempts to derive return and volatility characteristics for, and correlations among, a wide variety of investment asset classes. Certain alternative asset classes, such as private equity and real estate, are illiquid and thus not subject to regular pricing by the financial markets. We have attempted to derive returns, volatilities and correlations for these asset classes by using certain market observations and a variety of statistical techniques. While we believe our observations to be theoretically sound, you should be aware that this analysis involves a high number of estimates and is subject to high degree of uncertainty. Actual portfolio composition for clients will be based on strategic decisions of the Investment Policy Committee.

Appendix

Supporting Details for the Whole Net Worth Case Study

Whole Net Worth Case Study

Whole Net Worth Methodology

- Incorporates a new methodology for measuring return and risk of "illiquid assets" vs. "liquid assets"
- Reflects reduced confidence in predictability of alternative investment returns within a robust traditional asset allocation framework
- Considers client risk tolerance from two perspectives: market risk and illiquidity risk
- Employs a new methodology for estimating downside risk
- To account for the non-normal distributions of the illiquid asset classes we use Monte Carlo simulations to generate thousands of hypothetical returns for each asset class.
- These generated returns are the basis for calculating estimates of risk.
  - ▲ Probability below 0%: the proportion of generated returns that are negative
  - ▲ Average shortfall below 0%: the average among generated returns that are negative
  - ▲ Downside risk: the product of the above two factors
  - ▲ Worst case return: the average among the lowest 1% of generated returns Whole Net Worth Case Study

Whole Net Worth Requires New Risk Metrics

Average Shortfall Below Zero and Probability of a Negative Return are Additional Measures of Risk

Average shortfall represents the estimated average size of a potential loss

▶ Represents the estimated average of returns below a specified level. In this example we are using 0%.

▶ Captures the estimated downside risk associated with market returns or events.

Probability of a negative return provides an indication of frequency of occurrence

Downside Risk is the estimated probability-weighted average shortfall

▶ Represents the product of the average shortfall below zero and the probability of a negative return.

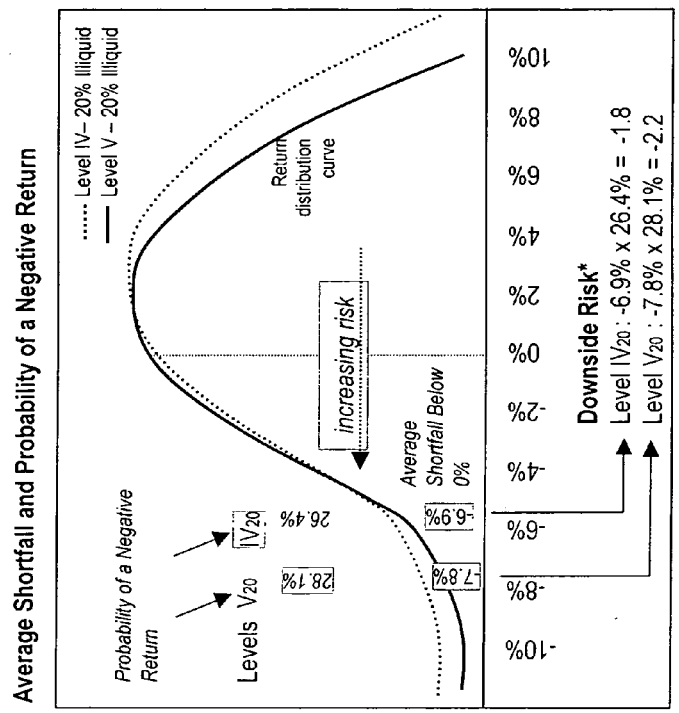

Average Shortfall and Probability of a Negative Return

*The _____ Private Bank Downside Risk indicator is the Probability weighted Average Shortfall below zero. It is the product of the average shortfall below zero and the probability of a negative return.
The above risk estimates are based on 20% illiquid models IV and V.

For illustrative purposes only. Expected returns and risks do not guarantee future results.

Liquidity Guide

This guide is designed to assist clients/prospects in determining a suitable level of illiquid asset (private equity and real estate) for their investment portfolios. It is designed with the Whole Net Worth illiquidity tiers of 0%, 10%, 20% and 30% in mind. At each tier, a series of questions is posed to the investor, which are intended to ascertain the investor's tolerance for illiquid assets. The tiers are arranged sequentially in this guide, starting with zero illiquidity. Please note this guide should be used in conjunction with a current IOS form.

0% Illiquid Criteria

A 'no' answer to any of the questions in this section indicates that illiquid investments are likely to be unsuitable for the client.

1. Is the investor's time horizon 5-10 years or more?
2. After meeting foreseeable spending needs, does the investor have sufficient liquid assets?
3. Does the investor have sufficient reserves for unforeseen emergency events?
4. Does the investor have the ability to extend his or her investment period by 2 or more years beyond the projected time horizon (i.e., investment extension risk) if investment markets are performing very poorly?
5. There is an association between tolerance for market uncertainty, investment extension risk and acceptance of illiquidity. Does the investor have at least some tolerance for uncertainty and risk (CPB risk level 2-3), and is the investor unlikely to become very intolerant of risk (i.e., move to CPB risk level 1) over time?
6. Does the investor have significant experience (e.g., 5 years experience with 30% market exposure) with volatile investments such as public equity?

If all six questions in this section are answered 'yes,' the investor may consider illiquid

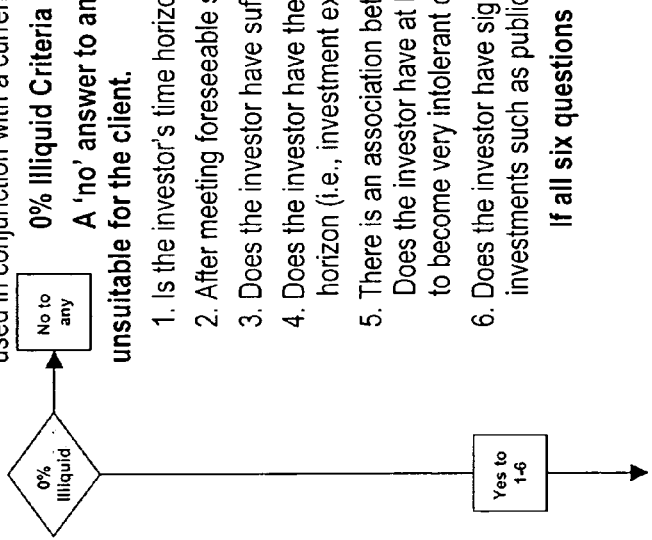

Liquidity Guide

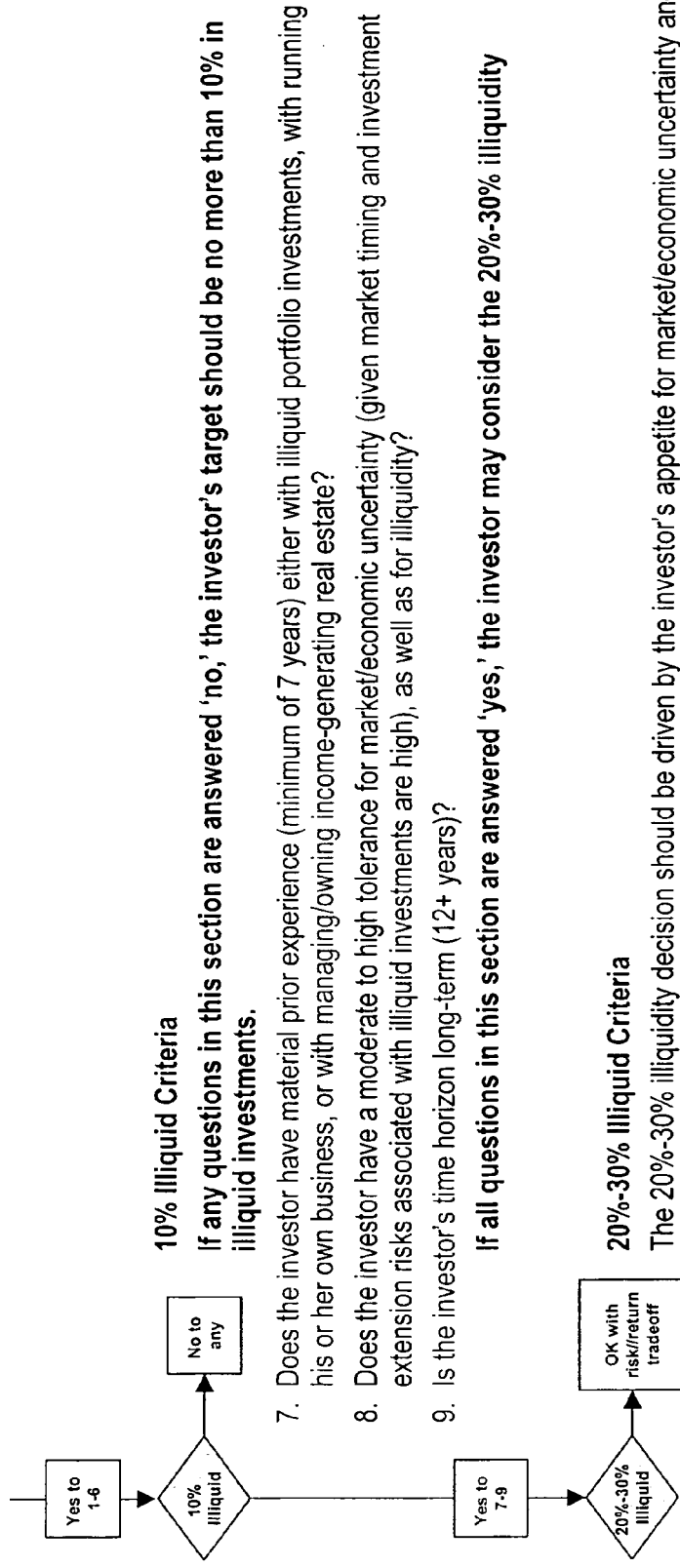

10% Illiquid Criteria

If any questions in this section are answered 'no,' the investor's target should be no more than 10% in illiquid investments.

7. Does the investor have material prior experience (minimum of 7 years) either with illiquid portfolio investments, with running his or her own business, or with managing/owning income-generating real estate?

8. Does the investor have a moderate to high tolerance for market/economic uncertainty (given market timing and investment extension risks associated with illiquid investments are high), as well as for illiquidity?

9. Is the investor's time horizon long-term (12+ years)?

If all questions in this section are answered 'yes,' the investor may consider the 20%-30% illiquidity

20%-30% Illiquid Criteria

The 20%-30% illiquidity decision should be driven by the investor's appetite for market/economic uncertainty and long lock-up periods. An investor considering this level of illiquid exposure should also have substantial prior involvement with illiquid investments, such as commercial real estate and private equity. In deciding what proportion of illiquid assets to hold, these investors should refer to the return /risk tradeoff. Our research suggests that expected return is increased by about 40 basis points per annum when moving from 20% illiquid assets to 30%. (Of course, expected return is no guarantee of actual results.) Volatility also increases in this step; however, for most investors, the associated risk is not enough to move the individual to a higher CPB risk level.

Expected Return, Risk Metrics and Correlations[1]

Return and Risk Measures

| | Expected Return | Risk | Sharpe Ratio[2] | Downside Risk[3] | Probability <0% | Average Shortfall <0[4] | Hypothetical Worst Case Return[5] |
|---|---|---|---|---|---|---|---|
| Cash | 3.1% | 0.5% | N/A | N/A | 0% | N/A | 1.9% |
| Bonds | 4.5% | 4.0% | 0.35 | -0.3 | 13.2% | -2.0% | -4.6% |
| Equities | 7.9% | 15.2% | 0.32 | -2.8 | 30.9% | -9.0% | -24.6% |
| Private Equity | 11.6% | 25.9% | 0.33 | -4.8 | 35.9% | -13.4% | -35.0% |
| Real Estate | 7.0% | 10.5% | 0.37 | -1.6 | 24.6% | -6.6% | -18.9% |
| Hedge Funds | 8.3% | 6.7% | 0.77 | -0.3 | 10.2% | -3.1% | -6.9% |

Correlation Matrix

| | Cash | Bonds | Equities | Private Equity | Real Estate | Hedge Funds[6] |
|---|---|---|---|---|---|---|
| Cash | 1.00 | 0.27 | -0.04 | -0.14 | -0.11 | -0.04 |
| Bonds | | 1.00 | 0.19 | -0.18 | 0.03 | 0.21 |
| Equities | | | 1.00 | 0.75 | 0.44 | 0.72 |
| Private Equity | | | | 1.00 | 0.35 | 0.85 |
| Real Estate | | | | | 1.00 | 0.36 |
| Hedge Funds | | | | | | 1.00 |

1. The forecasted return and risk estimates are calculated at the broad asset class level using a methodology that derives returns, volatilities and correlations by using market observations and a variety of statistical methods based on our estimates and assumptions. As such, although we believe our methodology to be sound, it is subject to a high degree of uncertainty and therefore does not guarantee future results.
2. A risk-adjusted measure calculated by dividing the portfolio's expected return minus the risk-free rate of 3.1% (CPB's strategic return for cash) by its expected risk.
3. The ' ) Private Bank Proprietary Downside Risk estimate is calculated by multiplying the Probability Below 0% by the average shortfall below 0%. Private Bank's proprietary Whole Net Worth methodology.
4. The average of the negative returns.
5. The average of the lowest 1% of the estimated returns.
6. High Risk Hedge Funds. Correlations and related statistics are estimates using
For illustrative purposes only. Expected returns and risks do not guarantee future results.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A computer-implemented method of matching an investor's objectives for portfolio investment return and risk with an assessment of a range of expected returns and risks that are likely to be generated by investment portfolios consisting at least in part of alternative asset classes comprising:

selecting available historical data for a plurality of alternative asset classes by a first computer software application process tangibly embodied in a physical program storage device executable by a physical computing machine and executing on the physical computing machine;

unsmoothing the historical data based at least in part on historical data for traditional asset classes related to the respective alternative asset classes by a second computer software application process tangibly embodied in a physical program storage device executable by a physical computing machine and executing on the physical computing machine, wherein unsmoothing the historical data further comprises computing an estimate of marked-to-market returns for the alternative asset classes based at least in part on the historical data for the traditional asset classes related to the respective asset classes;

correcting the historical data for the alternative asset classes for an impact of survivorship and selection biases by a third computer software application process tangibly embodied in a physical program storage device executable by a physical computing machine and executing on the physical computing machine;

computing a forecast of an expected return and risk for each of the alternative asset classes based at least in part on the unsmoothed and corrected historical data for the alternative asset classes by a fourth computer software application process tangibly embodied in a physical program storage device executable by a physical computing machine and executing on the physical computing machine, wherein at least one of said alternative asset classes further comprises a hedge fund and computing the forecast of expected return and risk further comprises computing an estimate of the respective proportions of the return for said hedge fund that are related to an average market exposure and those that are generated by manager skill, and wherein computing the forecast of expected return and risk further comprises computing a forecast of expected return for said proportion related to the average market exposure based at least in part on a forecast for a traditional equity asset class and calculating a forecast of expected return for said proportion generated by manager skill based on the respective proportions; and identifying at least one of the alternative asset classes having an expected return and risk that corresponds substantially to the investor's objectives for portfolio investment return and risk for inclusion in the investment portfolio by a fifth computer software application process tangibly embodied in a physical program storage device executable by a physical computing machine and executing on the physical computing machine.

2. The method of claim 1, wherein correcting the historical data for an impact of survivorship and selection biases further comprises computing an estimate of the impact of survivorship and selection biases based at least in part on modeling techniques and academic research.

3. The method of claim 1, wherein computing the forecast of expected return and risk for each of the alternative asset classes further comprises computing the forecast of expected return and risk incrementally.

4. The method of claim 3, wherein computing the forecast of expected return and risk incrementally further comprises computing the forecast of incrementally beginning with lower-risk alternative asset classes and progressing to higher-risk alternative asset classes.

5. The method of claim 1, wherein computing the forecast of expected return and risk further comprises adjusting the computation for an impact of fees on expected return.

6. The method of claim 5, wherein adjusting the computation for the impact of fees further comprises subtracting fees for a fund-of-funds from a computation of the estimate of return.

7. The method of claim 1, wherein computing the forecast of expected return and risk further comprises adjusting the computation for an impact of taxes on expected return for a taxable investor.

8. The method of claim 1, further comprising computing an estimate of downside risk effect of the at least one identified alternative asset class on the investor's objectives for portfolio investment return and risk.

9. The method of claim 8, wherein computing the estimate of downside risk effect further comprises quantifying the downside risk using value-at-risk (VaR) at a predetermined level of confidence.

10. The method of claim 1, wherein computing the estimates for the plurality of expected returns further comprises computing the estimates using Monte Carlo simulation.

11. The method of claim 10, wherein computing the estimates for the plurality of expected returns further comprises computing the estimates using Monte Carlo simulation.

12. The method of claim 1, further comprising computing an estimate of at least one of an enhancement effect on return and a reduction effect on risk of a degree if illiquidity of the at least one identified alternative asset class on the investor's objectives for portfolio investment return and risk.

13. The method of claim 12, wherein computing the estimate of said at least one of the enhancement and reduction effects further comprises computing the estimate based on investment limitations imposed by the degree of illiquidity of the at least one identified alternative asset class on the investor's objectives for portfolio investment return and risk.

14. The method of claim 12, wherein computing the estimate of said at least one of the enhancement and reduction effects further comprises computing the estimate based on investor constraints imposed by the degree of illiquidity of the at least one identified alternative asset class on the investor's objectives for portfolio investment return and risk.

15. A computer-implemented system for matching an investor's objectives for portfolio investment return and risk with an assessment of a range of expected returns and risks that are likely to be generated by investment portfolios consisting at least in part of alternative asset classes, comprising:

a first computer software application process tangibly embodied in a physical program storage device executable by a physical computing machine and executing on the physical computing machine that selects available historical data for a plurality of alternative asset classes;

a second computer software application process tangibly embodied in a physical program storage device executable by a physical computing machine and executing on the physical computing machine that unsmooths the historical data based at least in part on historical data for traditional asset classes related to the respective alternative asset classes, wherein unsmoothing the historical data further comprises computing an estimate of marked-to-market returns for the alternative asset classes based at least in part on the historical data for the traditional asset classes related to the respective alternative asset classes;

a third computer software application process tangibly embodied in a physical program storage device executable by a physical computing machine and executing on the physical computing machine that corrects the historical data for the alternative asset classes for an impact of survivorship and selection biases;

a fourth computer software application process tangibly embodied in a physical program storage device executable by a physical computing machine and executing on the physical computing machine that computes a forecast of an expected return and risk for each of the alternative asset classes based at leas in part on the unsmoothed and corrected historical data for the alternative asset classes, wherein at least one of said alternative asset classes further comprises a hedge fund and computing the forecast of expected return and risk further comprises computing an estimate of the respective proportions of the return for said hedge fund that are related to an average market exposure and those that are generated by manager skill, and wherein computing the forecast of expected return and risk further comprises computing a forecast of expected return for said proportion related to the average market exposure based at least in part on a forecast for a traditional equity asset class and calculating a forecast of expected return for said proportion generated by manager skill based on the respective proportions; and a fifth computer software application process tangibly embodied in a physical program storage device executable by a physical computing machine and executing on the physical computing machine that identifies at least one of the alternative asset classes having an expected return and risk that corresponds substantially to the investor's objectives for portfolio investment return and risk.

* * * * *

UNITED STATES PATENT AND TRADEMARK OFFICE
CERTIFICATE OF CORRECTION

| | |
|---|---|
| PATENT NO. | : 7,599,872 B2 |
| APPLICATION NO. | : 10/939641 |
| DATED | : October 6, 2009 |
| INVENTOR(S) | : Doug R. Dundas, Rui Defigueiredo and Paul Goldwhite |

It is certified that error appears in the above-identified patent and that said Letters Patent is hereby corrected as shown below:

ON THE TITLE PAGE IN THE INVENTORS ITEM (75)

Please change "Rui Defigueiredo, San Francisco, CA" to -- Rui Defigueiredo, Piedmont, CA --

In Column 47, Line 31, please change "traditional asset classes related to the respective asset" to -- traditional asset classes related to the respective alternative asset --

In Column 48, Line 12, please change "computing the forecast of incrementally beginning with" to -- computing the forecast incrementally beginning with --

In Column 48, Lines 34 through 36, please replace the following claim:

"10. The method of claim 1, wherein computing the estimates for the plurality of expected returns further comprises computing the estimates using Monte Carlo simulation."

(replace) with

-- 10. The method of claim 1, further comprising computing estimates for a plurality of expected returns for the at least one identified alternative asset class at a plurality of levels of risk. --

In Column 49, Line 24, please change "native asset classes based at leas in part on the" to -- native asset classes based at least in part on the --

Signed and Sealed this

Twenty-fourth Day of November, 2009

David J. Kappos
*Director of the United States Patent and Trademark Office*